United States Patent
Guo et al.

(10) Patent No.: US 7,619,407 B2
(45) Date of Patent: Nov. 17, 2009

(54) GEAR TOOTH SENSOR WITH SINGLE MAGNETORESISTIVE BRIDGE

(75) Inventors: Yimin Guo, San Jose, CA (US); Grace Gorman, San Jose, CA (US)

(73) Assignee: MagIC Technologies, Inc., Milpitas, CA (US)

( * ) Notice: Subject to any disclaimer, the term of this patent is extended or adjusted under 35 U.S.C. 154(b) by 0 days.

(21) Appl. No.: 12/082,257

(22) Filed: Apr. 10, 2008

(65) Prior Publication Data

US 2009/0256552 A1 Oct. 15, 2009

(51) Int. Cl.
*G01B 7/30* (2006.01)
*G01R 33/09* (2006.01)

(52) U.S. Cl. .......................... 324/207.25; 324/207.21; 324/252

(58) Field of Classification Search ......... 324/173–174, 324/207.2, 207.21, 207.25, 252; 73/514.16, 73/514.31, 514.39; 338/32 R, 32 H
See application file for complete search history.

(56) References Cited

U.S. PATENT DOCUMENTS

| | | | |
|---|---|---|---|
| 7,138,793 | B1 | 11/2006 | Bailey |
| 7,195,211 | B2 | 3/2007 | Kande et al. |
| 2003/0107366 | A1 | 6/2003 | Busch et al. |
| 2003/0128027 | A1* | 7/2003 | Buchhold et al. ...... 324/207.21 |
| 2006/0103373 | A1* | 5/2006 | Ricks et al. ............ 324/207.21 |
| 2008/0136404 | A1* | 6/2008 | Gauthier et al. .......... 324/207.2 |
| 2008/0180090 | A1* | 7/2008 | Stolfus et al. ................ 324/174 |
| 2008/0246465 | A1* | 10/2008 | Butzmann .................... 324/174 |

OTHER PUBLICATIONS

Co-pending US Patent HMG06-046, U.S. Appl. No. 11/788,912, filed Apr. 23, 2007, "MTJ Sensor Including Domain Stable Free Layer," assigned to the same assignee as the present invention.
Co-pending US Patent HMG07-019, U.S. Appl. No. 11/904,668, filed Sep. 28, 2007, "Method for providing FM Exchange Pinning Fields in Multiple Directions on Same Substrate," assigned to the same assignee as the present invention.
"Exchange anisotropy and micromagnetic properties of PtMn/NiFe bilayers," by Pokhil et al., Journal of Applied Physics, vol. 89, No. 11, Jun. 1, 2001, pp. 6588-6590.
"Precision Gear Tooth and Encoder Sensors," GT Sensors, NVE Corporation, application note, www.nve.com, pp. 46-55.
Infineon application note "Dynamic Differential Hall Effect Sensor IC TLE 4923", Infineon Technologies , Data Shee, pp. 1-18, found www.datasheetcatalog.com, Jul. 1, 2000.
"Application Notes for GMR Sensors," NVE Corporation, pp. 78-130, www.nve.com.

* cited by examiner

*Primary Examiner*—Bot L LeDynh
(74) *Attorney, Agent, or Firm*—Saile Ackerman LLC; Stephen B. Ackerman

(57) ABSTRACT

The invention discloses a rotation sensor suitable for gear wheels. MR (magneto-resistive) sensors are placed inside a zero field region generated by at least two permanent magnets. The sensors are divided into two groups that are immersed in different locally generated magnetic environments. A differential signal taken between the two groups then senses the movement of the wheel's teeth. A single wafer method for manufacturing the device is also briefly described.

20 Claims, 4 Drawing Sheets

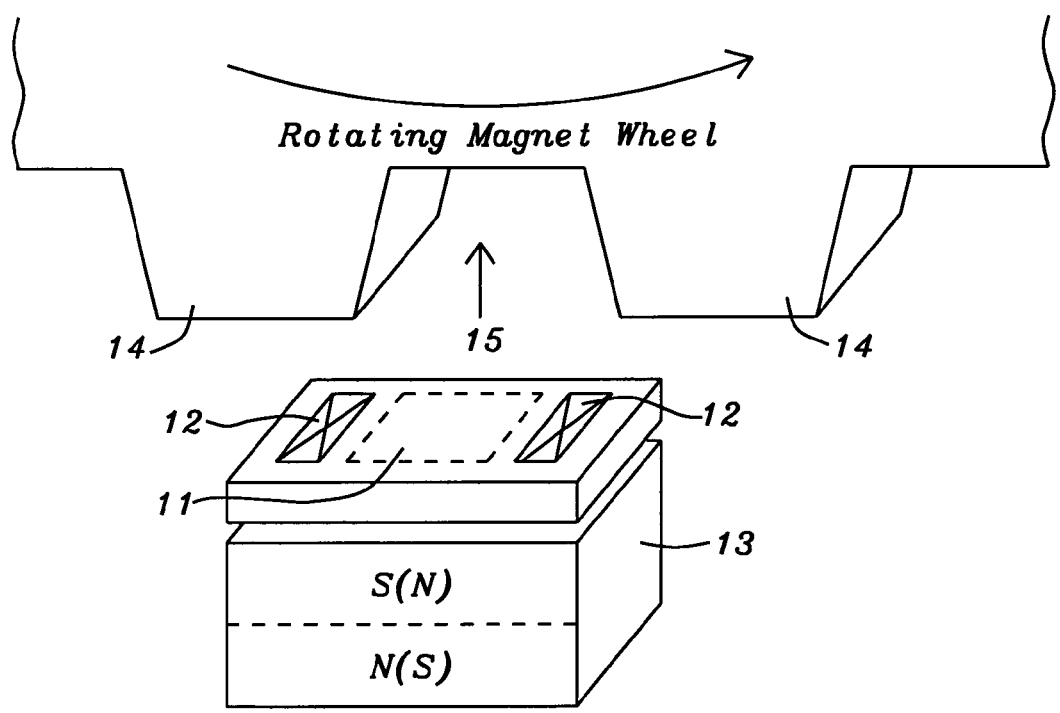
FIG. 1 – Prior Art

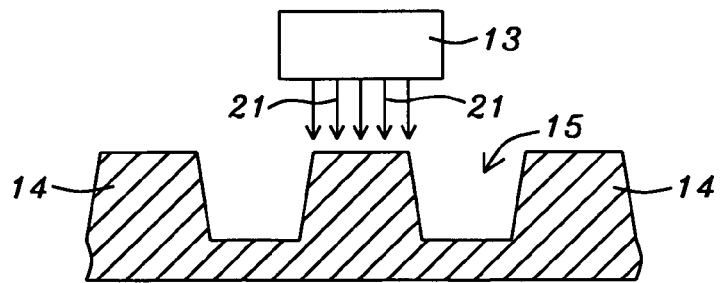
FIG. 2a – Prior Art
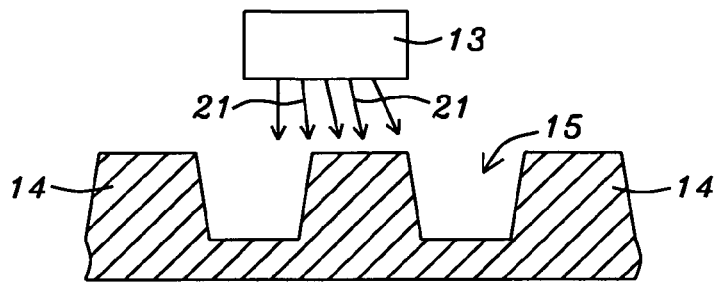
FIG. 2b – Prior Art
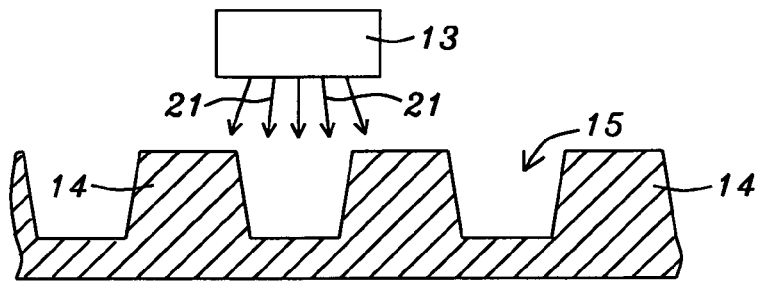
FIG. 2c – Prior Art
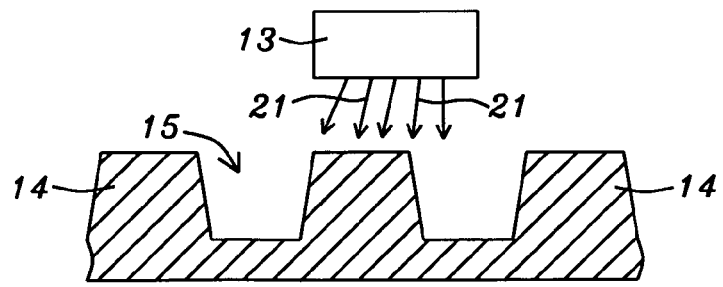
FIG. 2d – Prior Art

US 7,619,407 B2

GEAR TOOTH SENSOR WITH SINGLE MAGNETORESISTIVE BRIDGE

RELATED APPLICATIONS

Application Ser. No. 11/788,912, filed Apr. 23, 2007, describes a magnetic detector that may be used to measure electric currents without being affected by local temperature fluctuations and/or stray fields. Application Ser. No. 11/904,668, filed Sep. 28, 2007, describes simultaneous setting of exchange pinning field magnetization in more than one direction for several thin film structures on a single substrate. Both applications are herein incorporated, by reference, in their entirety.

FIELD OF THE INVENTION

The invention relates to the general field of tachometry, specifically toothed wheels, through use of magnetic detectors based on GMR (Giant Magneto-resistive) or MTJ (Magnetic Tunnel Junction) devices

BACKGROUND OF THE INVENTION

A conventional gear tooth sensor [1] consists of an IC (integrated circuit) 11 that includes Hall effect sensors 12 together with a single hard magnet 13, as shown in FIG. 1. The IC supports two Hall sensors, which sense the magnetic profile of the ferrous target simultaneously, but at different points, thereby generating a differential internal analog voltage that is further processed for precise switching of the digital output signal. To achieve a high differential signal output, the two Hall probes (or sensors) are spaced at a certain distance so that one Hall sensor faces field concentrating tooth 14 and the other Hall sensor faces gap 15 in the toothed wheel. A permanent magnet mounted with one pole on the rear side of the IC produces a constant magnetic bias field.

If one Hall sensor momentarily faces a tooth while the other faces a gap between teeth, the gear tooth acts as a flux concentrator. It increases the flux density through the Hall probe and a differential signal is produced. As the gear wheel turns, the differential signal changes its polarity at the same rate of change as from the tooth to the gap. An integrated highpass filter regulates the differential signal to zero by means of a time constant that can be set with an external capacitor. In this way only those differences that changed at a minimum rate are evaluated. The output signal is not defined when in the steady state.

A GMR based gear tooth sensor has also been proposed in which the sensing structure is similar to traditional Hall IC based gear tooth sensor except that the two Hall probes are replaced by two GMR sensors [2], as shown in FIGS. 2a-d. Due to the high sensitivity of GMR devices, the GMR based gear tooth sensors provide a very large output signal which is stable over the rated temperature and voltage range. As a result, GMR based gear tooth sensors feature excellent air-gap performance and an extremely stable operating envelops as well as robust reliability characteristics.

As shown in FIGS. 2a-d, the magnetic field generated by the bias magnet is influenced by the moving gear tooth, the GMR sensors serving to detect the variation of the magnetic field component within the GMR film plane. The signal output is then generated from differential signals from two GMR sensors or a GMR bridge. Since the permanent magnet is mounted with either pole on the rear side of the GMR sensors (as in the Hall IC based gear tooth sensor) the magnetic field is essentially perpendicular to the GMR films. So any variation in the mechanical placement of the permanent magnet or any tilting of the GMR sensors during assembly could result in a large offset field in the GMR film plane. As a result, degradation may occur. Also, in this prior art design, the two GMR sensors have to be placed a certain distance apart (~0.5 mm to 5 mm), depending on the particular gear tooth dimensions, so they cannot be initially formed on the same wafer. Instead, the individual GMR sensors must first be formed separately and then assembled along with other components of the IC. This is expensive and prone to causing additional variations from one installation to the next.

REFERENCES

1. Infineon application note "Dynamic Differential Hall Effect Sensor IC TLE 4923"
2. NVE application note "Precision Gear Tooth and Encoder Sensors"
3. Taras Pokhil, et., "Exchange Anisotropy and Micromagnetic Properties of PtMn/NiFe bilayers," J. Appl. Phys. 89, 6588 (2001)

A routine search of the prior art was performed with the following references of interest being found:

U.S. Patent Application 2003/0107366 (Busch et al) teaches that a sensing element can be one or two Hall elements or four magnetoresistive elements arranged in a Wheatstone bridge. In U.S. Pat. No. 7,195,211, Kande et al. teach that a gear tooth sensor can comprise a Hall effect sensor or a magnetorestive sensor. U.S. Pat. No. 7,138,793 (Bailey) also shows that a gear tooth sensor can be a Hall effect sensor or a GMR sensor.

SUMMARY OF THE INVENTION

It has been an object of at least one embodiment of the present invention to provide a method for measuring rotation speeds of gear wheels that include some ferromagnetic material.

Another object of at least one embodiment of the present invention has been to provide a detector based on said method.

Still another object of at least one embodiment of the present invention has been to describe a process whereby said detector may be manufactured on a single chip or wafer without needing to add separately manufactured sub-assemblies or parts.

A further object of at least one embodiment of the present invention has been that said detector be relatively insensitive to its exact orientation relative to the toothed wheel that it is sensing.

These objects have been achieved by providing a design for a magneto-resistive gear tooth sensor based on single wafer processes together with new and improved methods for performing gear tooth sensor assembly. The result is a complete single chip solution with high accuracy and high signal output suitable for application to a wide range of gear tooth dimensions.

The MR sensor is located inside the near field region between the two (or more) permanent magnets for minimizing offset field effects generated during assembly. In prior art sensors, the offset field and variations thereof are unavoidably large, and at least two individual MR chips have had to be used and located at certain precise distances from the gear toothed wheel.

The invention teaches how to achieve MR-based measurements by using a single MR sensor having a better assembly margin. The same single MR sensor can be used over a range of different gear toothed wheel dimensions.

BRIEF DESCRIPTION OF THE DRAWINGS

FIG. 1. Prior art device using a Hall effect IC based gear tooth sensor.

FIGS. 2a-d. Prior art device showing sequence as gear moves past a GMR based gear tooth sensor.

DESCRIPTION OF THE PREFERRED EMBODIMENTS

Figure 3:
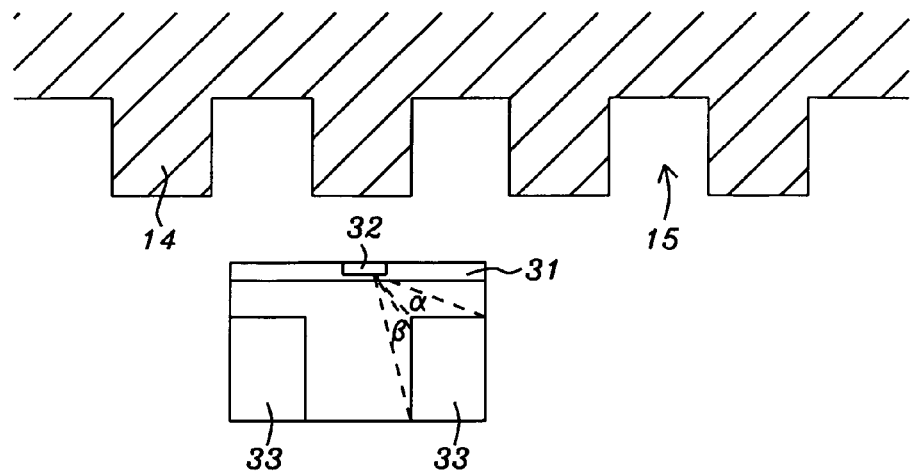
FIG. 3. The basic design of the invention's MR sensor assembly.

An important feature of the present invention is the use of multiple permanent magnets in conjunction with MR (GMR or MTJ) based gear tooth sensors. As seen in FIG. 3, sensor 31 (comprising two MR sensing elements or one MR Wheatstone bridge) whose magneto-resistive thin films 32 faces rotating gear 11 while two or more permanent magnets 33, with the same poles facing gear 11, are symmetrically arranged with respect to MR sensor 31 so that neither of them directly faces MR sensor 31.

As also shown in FIG. 3, the magnetic field at the MR sensor (as directly generated by a permanent magnet) depends on geometry as well as on the magnet's strength. For example, the right side magnet in FIG. 3 produces a vertical field as well as a horizontal field in the MR film plane. The vertical field is proportional to $(\alpha-\beta)M$, where $\alpha$ and $\beta$ are the angles subtended by the two opposing poles of magnet 33 at the MR sensor and M is the remnant magnetization of the magnet.

Arranging these two angles to be equal to each other reduces the vertical field to zero. Furthermore, since there are two magnets symmetrically located at opposite sides of MR sensor 32, the horizontal field is also cancelled out. When used for gear tooth wheel speed detection, the sensor assembly is brought close to and facing the gear wheel. As the ferrous teeth move, the magnetic flux generated by the permanent magnets changes and the MR sensor experiences a changing field in the MR film plane.

Figure 4:
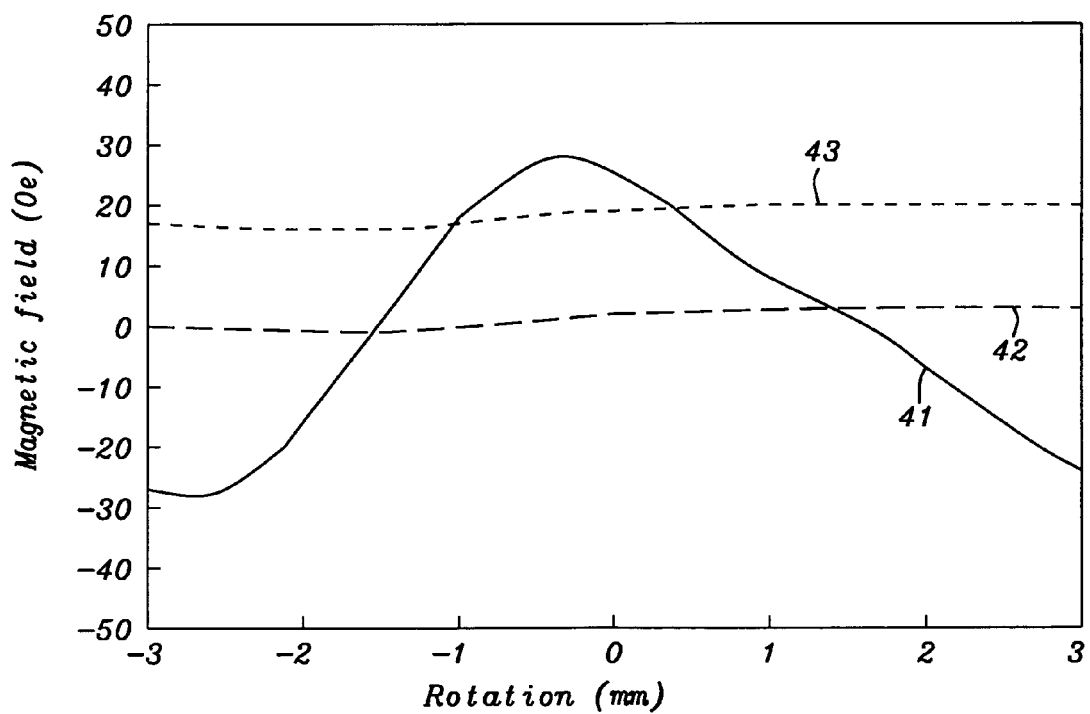
FIG. 4. Plots the MR signal that is generated as the toothed wheel rotates.

FIG. 4 shows simulated data for the MR signal as the toothed wheel rotates. The pitch of the gear tooth was assumed to be 6 mm while the sensor was specified to be 1.5 mm from a tooth at closest approach. Curve 41 represents the horizontal magnetic field experienced by the MR sensor. Since there is always some tilting of the MR sensor relative to the magnets, the offset field due to the tilting was also calculated. In the disclosed design, since the vertical field is zero (or close to zero) because of the special arrangement of the magnets, the offset field remains very small. This is reflected in curve 42, while for a design of the prior art the offset field could be as large as 60% of the horizontal field even for a small (3-degree) tilt, as shown by curve 43. An offset field of this magnitude is sufficient to cause an unacceptably large detection error.

An additional feature of the invention is are the methodology that we now disclose that we have developed in order to be able to employ a wafer-level process for manufacturing the MR (GMR or MTJ) based gear tooth sensors along with their associated multiple permanent magnets. In the sensor, two MR sensing elements or one MR Wheatstone bridge are used to sense the magnetic field. To increase sensitivity, the magnetic environments experienced by the two sensing elements are arranged to be different. Two different ways of achieving this are disclosed in the two embodiments of the invention.

Figure 5:
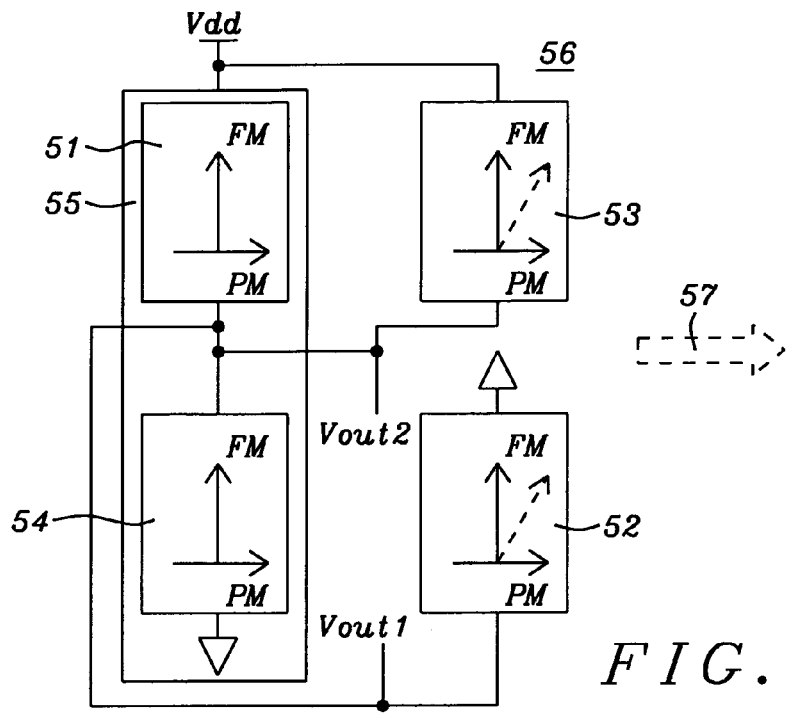
FIG. 5. Illustrates a first embodiment of the invention.

A first embodiment of the invention is illustrated in FIG. 5. Seen there is Wheatstone bridge 56 which comprises four identical MR elements (stripes), 51, 52, 53 and 54. A constant voltage is applied across both branches (51, 52) and (53, 54). Output voltage Vout1 is taken from the mid-point of the first branch (51,52) and output voltage Vout2 is taken from the mid-point of the second branch (53, 54). Each MR element has the same uniaxial anisotropy along its longitudinal direction, while the pinned magnetization (PM) within the MR is perpendicular to its longitudinal direction. Also shown is arrow 57 which represents the gear field.

A key feature of a first embodiment of the invention is magnetic shield 55 which comprises a layer of soft ferromagnetic material located either underneath or above elements 51 and 54 alone. The presence of the shield means that opposite arms of the bridge are immersed in different magnetic environments. When the invention is in use, as the toothed wheel rotates, an alternating magnetic field (gear field) is produced at the MR bridge and the free magnetizations (FM) in MR elements 52 and 53 rotate in response to the field, while the free magnetizations in the MR elements 51 and 54 do not change because of the shielding effect. The output signal (Vout1−Vout2) is generated as a function of the local gear field. Said output signal is amplified and processed in a suitable circuit to determine the rotational speed of the toothed wheel. The fact that, in each case, one of the MR elements is magnetically shielded while the other is not, results in a larger differential signal than would be obtained if all elements were immersed in the same magnetic environment.

Figure 6:
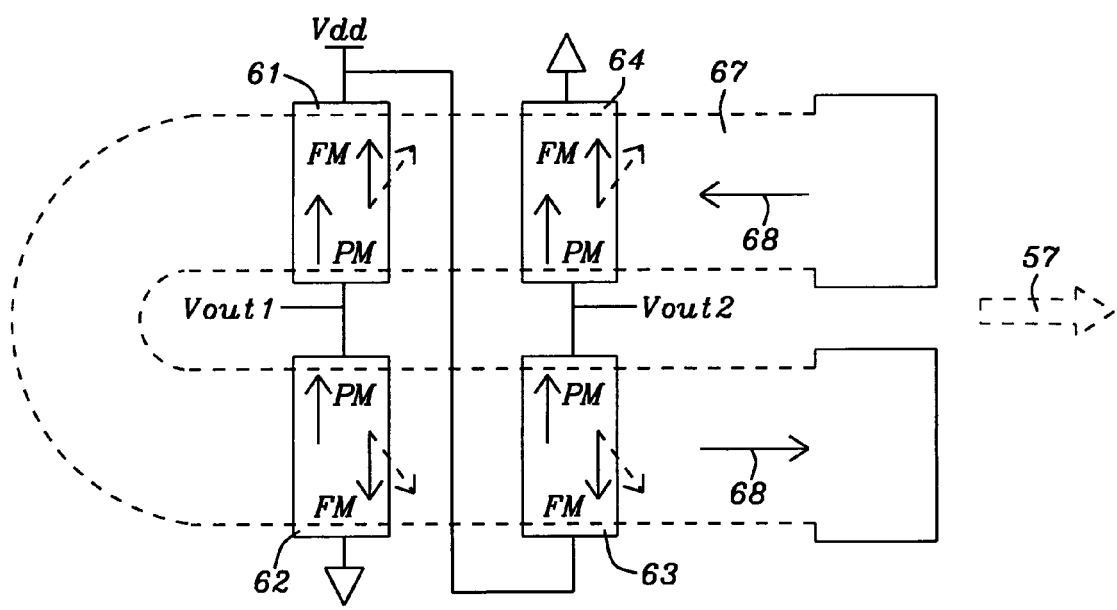
FIG. 6. Illustrates a second embodiment of the invention.

In FIG. 6 we illustrate a second embodiment of the invention. Shown there is MR bridge 66 and single turn coil 67. The MR Wheatstone bridge consists of four identical MR elements (stripes), 61, 62, 63 and 64. A constant voltage is applied across both branches (61, 62) and (63, 64). Output voltage Vout1 is from the mid-point of the first branch (61, 62) and output voltage Vout2 is from the mid-point of the second branch (63, 64). Each MR element has the same uniaxial anisotropy along its longitudinal direction, while the pinned magnetization (PM) within the MR is also along its longitudinal direction.

Coil 67, made of a highly conductive material, is located underneath or above all elements and generates magnetic fields at 61 and 64 along their first longitudinal direction, as well as magnetic fields at 62 and 63 along their second longitudinal direction (antiparallel to the field direction seen by elements 61 and 64). Thus, as in the first embodiment, MR sensors 61 and 64 see different magnetic environments than do sensors 62 and 63, resulting, as before, in an enhanced differential signal.

During operation of the device, prior to each reading, a large electric current pulse (symbolized by arrows 68) is passed through coil 67, to pre-set the magnetization of the free layers in MR elements 61 and 64 along the first longitudinal direction, as well as to pre-set the free layer magnetizations in other two MR elements, 62 and 63 along the second longitudinal direction. As the toothed wheel rotates, an alternating magnetic field (gear field) is produced on the MR bridge, to which the magnetizations in MR elements 62 and 63 respond by rotating so as to decrease their resistance values, while magnetizations in MR elements 61 and 64 respond by rotating so as to increase their resistance values. The output signal (Vout1−Vout2) is generated as function of the local gear field. Said output voltage is amplified and processed in a suitable circuit for determining the rotational speed of the toothed wheel.

The technology disclosed in application Ser. No. 11/904,668 (incorporated above by reference) was used to fabricate the structures that constitute the present invention in a single wafer process. Briefly, the various sub-structures are simultaneously magnetized into different directions through use of exchange pinning fields; all sub-structures were first formed in their required orientations. A layer of hard magnetic material was then deposited, suitably patterned to control the direction of its flux, and then magnetized through a single exposure to a strong magnetic field. The assemblage was then thermally annealed (in the absence of any applied field) at a temperature higher than the AFM material's blocking temperature, following which the thin film structures became magnetically pinned in the intended directions.

The poles of the two permanent magnets (corresponding to magnets 33 in FIG. 3) typically had cross-sectional areas in the range of from 0.5 to 50 sq. mm and heights (pole separation) in the range of from 0.5 to 20 mm. Following exposure to an external field in the range of from 1,000 to 20,000 Oe, these permanent magnets acquired a magnetization in the range of from 0.1 to 1.0 Tesla. Suitable materials for the permanent magnets included (but were not limited to) Alnico, Samarium cobalt, Neodymium-Iron-Boron and other ceramic magnets.

For both embodiments, the MR elements may be either GMR or MTJ devices.

What is claimed is:

1. A method to measure rotational speed of a toothed wheel whose teeth include ferromagnetic material, comprising:
   providing at least two permanent magnets;
   disposing said permanent magnets so as to form a zero field region;
   placing in said zero field region an even number of MR (magneto-resistive) devices divided into equal-sized first and second groups;
   arranging for said first group to be immersed in a different magnetic environment from that in which said second group is immersed, whereby said permanent magnets and said MR sensors, including said magnetic environments, together form a rotational speed detector; and
   then placing said rotational speed detector near said toothed wheel whereby, when said toothed wheel rotates, a differential signal taken between said first and second groups of MR detectors may be used to determine at what rate teeth from said toothed wheel pass by said rotational speed detector.

2. The method of claim 1 wherein said MR devices are selected from the group consisting of GMR and MTJ devices.

3. The method of claim 1 further comprising:
   inter-connecting said MR devices to form a Wheatstone bridge in which said first and second groups each contain a first MR device whose input comes from an external source and whose output is connected to a first output of said Wheatstone bridge and a second MR device whose input comes from an MR device not in said second MR device's group and whose output is connected to a second output of said Wheatstone bridge;
   magnetically shielding all members of said first group; and
   leaving all members of said second group without magnetic shielding, whereby an enhanced differential signal is generated between said first and second groups.

4. The method of claim 1 further comprising:
   inter-connecting said MR devices to form a Wheatstone bridge in which said first and second groups each contain a first MR device whose input comes from an external source and whose output is connected to a first output of said Wheatstone bridge and a second MR device whose input comes from an MR device not in said second MR device's group and whose output is connected to a second output of said Wheatstone bridge;
   immersing all members of said first group in a first locally generated magnetic field having a first direction; and
   immersing all members of said second group in a second locally generated magnetic field having a second direction that is different from said first direction.

5. The method of claim 4 wherein said second direction is antiparallel to said first direction, whereby an enhanced differential signal is generated between said first and second groups.

6. The method of claim 4 wherein said first and second locally generated fields derive from a current through a single turn coiled conductor.

7. The method of claim 6 further comprising, passing an electric current pulse through said single coiled conductor to pre-set directions of magnetization of free layers in said MR devices along said first and second directions.

8. The method of claim 1 wherein exchange pinning fields are utilized to enable said rotational speed detector to be fabricated from, and on, a single wafer.

9. The method of claim 1 wherein each of said permanent magnets has a cross-sectional area in the range of from 0.5 to 50 sq. mm and a height in the range of from 0.5 to 20 mm.

10. The method of claim 1 wherein said permanent magnets each have a magnetization in the range of from 0.1 to 1.0 Telsa.

11. A detector to measure rotational speed of a toothed wheel whose teeth include ferromagnetic material, comprising:
    at least two permanent magnets;
    a zero field region generated by said permanent magnets;
    located in said zero field region, an even number of MR (magneto-resistive) devices arranged in first and second groups;
    said MR devices being inter-connected as a Wheatstone bridge in which said first and second groups each contain a first MR device whose input comes from an external source and whose output is connected to a first output of said Wheatstone bridge, and a second MR device whose input comes from an MR device not in said second MR device's group and whose output is connected to a second output of said Wheatstone bridge; and
    a magnetic shield for all members of said first group, there being no magnetic shielding for all members of said second group.

12. The detector described in claim 11 wherein said MR devices are selected from the group consisting of GMR and MTJ devices.

13. The detector described in claim 11 wherein each of said permanent magnets has a cross-sectional area in the range of from 0.5 to 50 sq. mm and a height in the range of from 0.5 to 20 mm.

14. The detector described in claim 11 wherein said permanent magnets each have a magnetization in the range of from 0.1 to 1.0 Telsa.

15. A detector to measure rotational speed of a toothed wheel whose teeth include ferromagnetic material, comprising:
    at least two permanent magnets;
    a zero field region generated by said permanent magnets;

located in said zero field region, an even number of MR (magneto-resistive) devices arranged in first and second groups;

said MR devices being inter-connected as a Wheatstone bridge in which said first and second groups each contain a first MR device whose input comes from an external source and whose output is connected to a first output of said Wheatstone bridge, and a second MR device whose input comes from an MR device not in said second MR device's group and whose output is connected to a second output of said Wheatstone bridge;

all members of said first group being immersed in a first locally generated magnetic field having a first direction; and all members of said second group being immersed in a second locally generated magnetic field having a second direction that is different from said first direction.

16. The detector described in claim 15 wherein said MR devices are selected from the group consisting of GMR and MTJ devices.

17. The detector described in claim 15 wherein said second direction is antiparallel to said first direction.

18. The detector described in claim 17 further comprising a single turn coiled conductor that, when energized, serves to provide said first and second locally generated fields.

19. The detector described in claim 15 wherein each of said permanent magnets has a cross-sectional area in the range of from 0.5 to 50 sq. mm and a height in the range of from 0.5 to 20 mm.

20. The detector described in claim 15 wherein said permanent magnets each have a magnetization in the range of from 0.1 to 1.0 Telsa.

* * * * *